(12) United States Patent
Simonsson et al.

(10) Patent No.: US 11,012,138 B2
(45) Date of Patent: May 18, 2021

(54) INITIATION OF A BEAM SWEEP PROCEDURE

(71) Applicant: Telefonaktiebolaget LM Ericsson (publ), Stockholm (SE)

(72) Inventors: Arne Simonsson, Gammelstad (SE); Anders Landström, Boden (SE); Peter Ökvist, Luleå (SE); Magnus Thurfjell, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/638,569

(22) PCT Filed: Sep. 6, 2017

(86) PCT No.: PCT/SE2017/050881
§ 371 (c)(1),
(2) Date: Feb. 12, 2020

(87) PCT Pub. No.: WO2019/050440
PCT Pub. Date: Mar. 14, 2019

(65) Prior Publication Data
US 2020/0220604 A1 Jul. 9, 2020

(51) Int. Cl.
*H04B 7/06* (2006.01)
*H04W 36/06* (2009.01)

(52) U.S. Cl.
CPC ......... *H04B 7/0695* (2013.01); *H04B 7/0626* (2013.01); *H04W 36/06* (2013.01)

(58) Field of Classification Search
CPC .. H04B 7/0695; H04B 7/0626; H04B 7/0632; H04W 36/06
See application file for complete search history.

(56) References Cited

U.S. PATENT DOCUMENTS

| | | | |
|---|---|---|---|
| 10,404,350 B2 * | 9/2019 | Nilsson | H04B 7/0426 |
| 2008/0310380 A1 | 12/2008 | Wullich et al. | |
| 2012/0119953 A1 | 5/2012 | Hosoya et al. | |
| 2013/0039345 A1 | 2/2013 | Kim et al. | |
| 2015/0341095 A1 | 11/2015 | Yu et al. | |
| 2016/0065287 A1 | 3/2016 | Kim et al. | |
| 2017/0111852 A1 | 4/2017 | Selen et al. | |
| 2017/0303264 A1 * | 10/2017 | Islam | H04B 7/0417 |
| 2018/0115355 A1 * | 4/2018 | Nagata | H04B 7/0695 |
| 2019/0069309 A1 * | 2/2019 | Nilsson | H04L 5/0057 |
| 2020/0028544 A1 * | 1/2020 | Bengtsson | H04B 7/088 |

OTHER PUBLICATIONS

International Search Report and Written Opinion dated May 30, 2018 for International Application No. PCT/SE2017/050881 filed on Sep. 6, 2017, consisting of 13-pages.
Communication dated Mar. 22, 2021 for European Patent Application No. 17769127.6, consisting of 6-pages.

* cited by examiner

*Primary Examiner* — Vineeta S Panwalkar
(74) *Attorney, Agent, or Firm* — Christopher & Weisberg, P.A.

(57) ABSTRACT

There is provided mechanisms for initiating a beam sweep procedure. A method is performed by a radio transceiver device. The method includes initiating, for a candidate beam set, a beam sweep procedure for communication with another radio transceiver device. Each beam in the candidate beam set has an associated angular spread value. During the beam sweep procedure, beams in the candidate beam set are swept in an order weighted according to the angular spread values.

22 Claims, 3 Drawing Sheets

INITIATION OF A BEAM SWEEP PROCEDURE

CROSS-REFERENCE TO RELATED APPLICATIONS

This application is a Submission Under 35 U.S.C. § 371 for U.S. National Stage Patent Application of International Application Number: PCT/SE2017/050881, filed Sep. 6, 2017 entitled "INITIATION OF A BEAM SWEEP PROCEDURE," the entirety of which is incorporated herein by reference.

TECHNICAL FIELD

Embodiments presented herein relate to a method, a radio transceiver device, a computer program, and a computer program product for initiating a beam sweep procedure.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

In general terms, the use of beamforming could imply that the terminal devices will be not only operatively connected to the network node via a beam but also performs a handover between (narrow) beams instead of between network nodes of different cells, or between transmission and reception points (TRPs) of one and the same network node. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node to keep track of its served terminal devices with narrow beams (as used at the TRP of the network node and/or at the terminal devices) in order to increase coverage and throughput.

For example, the so-called new radio (NR) access technology being considered for fifth generation (5G) telecommunications system could utilize so-called massive multiple-input multiple output (MIMO) systems for transmission and reception. This enables both spatial multiplexing and advanced beamforming. Beamforming is typically used with an aim to improve radio link quality and coverage whilst spatial multiplexing might improve user throughput and capacity. With sufficient number of antennas, such as used for so-called massive MIMO systems, both spatial multiplexing and advanced beamforming can be supported, enabling beamformed spatial multiplexing.

Beamforming could be implemented by means of analog beamforming, digital beamforming, or hybrid beamforming. Each implementation has its advantages and disadvantages.

For example, in analog beamforming using a "grid of beams" setup, a fixed set of beams is predefined and the network node at the network-side selects one of these beams for serving its terminal devices at the user-side at each transmission occasion. Due to e.g. the movement of terminal devices the beam choices are updated continuously to follow the changes in position of the terminal devices.

New transmission beams might be tested by transmitting, from the TRP of the network node, reference signals on candidate beams and receiving measurement reports from the terminal devices. Different beam sweep procedures can be used to select which candidate beams to test. One alternative is to perform an exhaustive beam sweep where all beams are repeatedly tested. This is a simple beam sweep procedure to implement and does not dependent on any input information. However, to select all beams as candidate beams might be costly in terms of signaling overhead and may delay the beam switch, thus risking service of the terminal devices to be interrupted.

Another alternative is to prioritize testing of beams close in angle to the used beam. This reduces overhead since the set of candidate beams is reduced to only the neighboring beams (in angular sense) to the beam currently used. However, it could still be challenging to find the best beams to serve the terminal devices in an efficient manner.

Hence, there is still a need for improved beam sweep procedures.

SUMMARY

An object of embodiments herein is to provide an efficient beam sweep procedure that does not have the issues and disadvantages noted above.

According to a first aspect there is presented a method for initiating a beam sweep procedure. The method is performed by a radio transceiver device. The method comprises initiating, for a candidate beam set, a beam sweep procedure for communication with another radio transceiver device. Each beam in the candidate beam set has an associated angular spread value. During the beam sweep procedure, beams in the candidate beam set are swept in an order weighted according to the angular spread values.

According to a second aspect there is presented a radio transceiver device for initiating a beam sweep procedure. The radio transceiver device comprises processing circuitry. The processing circuitry is configured to cause the radio transceiver device to initiate, for a candidate beam set, a beam sweep procedure for communication with another radio transceiver device. Each beam in the candidate beam set has an associated angular spread value. During the beam sweep procedure, beams in the candidate beam set are swept in an order weighted according to the angular spread values.

According to a third aspect there is presented a radio transceiver device for initiating a beam sweep procedure. The radio transceiver device comprises processing circuitry and a storage medium. The storage medium stores instructions that, when executed by the processing circuitry, cause the radio transceiver device to initiate, for a candidate beam set, a beam sweep procedure for communication with another radio transceiver device. Each beam in the candidate beam set has an associated angular spread value. During the beam sweep procedure, beams in the candidate beam set are swept in an order weighted according to the angular spread values.

According to a fourth aspect there is presented a radio transceiver device for initiating a beam sweep procedure. The radio transceiver device comprises an initiate module configured to initiate, for a candidate beam set, a beam sweep procedure for communication with another radio transceiver device. Each beam in the candidate beam set has an associated angular spread value. During the beam sweep procedure, beams in the candidate beam set are swept in an order weighted according to the angular spread values.

According to a fifth aspect there is presented a computer program for initiating a beam sweep procedure, the computer program comprising computer program code which, when run on a radio transceiver device, causes the radio transceiver device to perform a method according to the first aspect.

Advantageously this method, these radio transceiver devices, this computer program and this computer program product provide an efficient beam sweep procedure.

Advantageously this method, these radio transceiver devices, this computer program and this computer program product enable the amount of time to find the best beam to the so-called another radio transceiver device to be reduced compared to traditional beam sweep procedures.

Advantageously this method, these radio transceiver devices, this computer program and this computer program product enable the amount of overhead caused by beam probing device to be reduced compared to traditional beam sweep procedures.

According to a sixth aspect there is presented a computer program product comprising a computer program according to the fifth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
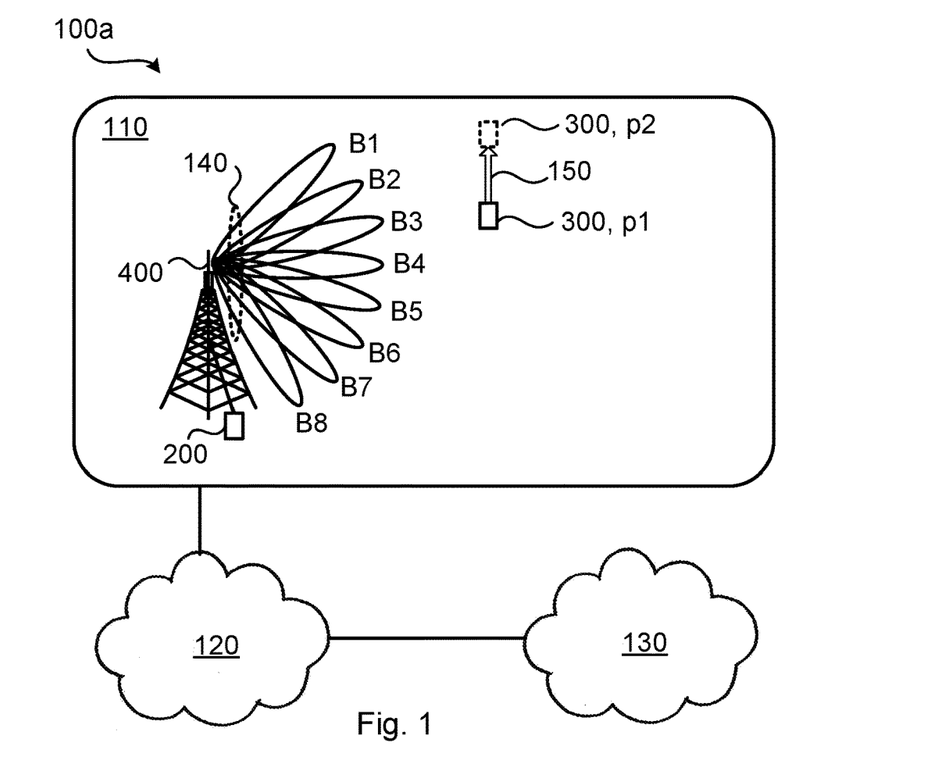
FIGS. 1 and 2 are schematic diagrams illustrating a communication network according to embodiments.

FIG. 1 is a schematic diagram illustrating a communications network bow where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network bow comprises a radio transceiver device 200 implemented as a network node and configured to, in a radio access network 110, provide network access to another radio transceiver device 300 implemented as a terminal device. The radio access network 110 is operatively connected to a core network 120. The core network 120 is in turn operatively connected to a service network 13o, such as the Internet. The radio transceiver device 300 is thereby, via radio transceiver device 200, enabled to access services of, and exchange data with, the service network 130. Examples of network nodes are radio access network nodes, radio base stations, base transceiver stations, Node Bs, evolved Node Bs, g Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The radio transceiver device 200 provide network access in the radio access network 110 by transmitting signals to, and receiving signals from, the radio transceiver device 300 in beams B1, B2, B3, B4, B5, B6, B7, B8. The signals could be transmitted from, and received by, a TRP 400 of the radio transceiver device 200. The TRP 400 could form an integral part of the radio transceiver device 200 or be physically separated from the radio transceiver device 200.

Assume now, for illustrative purposes, that radio transceiver device 300 moves in the direction given by arrow 150 from its current position p1 to a new position p2. It might then be needed to perform a beam sweep procedure in order to update which beam to be used for communication between radio transceiver device 200 and radio transceiver device 300.

As noted above it could be challenging to find the best beam(s) to serve the terminal devices in an efficient manner. In other words, it could be channeling to find the best beam(s) for communication between radio transceiver device 200 and radio transceiver device 300.

Performing a beam sweep procedure in all beams B1-B8 might be costly in terms of signaling overhead and may delay the beam switch. The search space might be reduced by, in the beam sweep procedure, only considering neighboring beam (in angular sense) to the current beam. For example, assuming that radio transceiver device 300 at position p1 is communicating with radio transceiver device 200 in beam B3, a reduced set of candidate beams could include only beams B2, B3, B4 or only beams B1, B2, B3, B4, B5, which will reduce the signaling overhead. However, to only select beams close in angle to the used beam introduces a risk that the best candidate beam is missed. This is true since it is not always so that a neighboring beam (in angular sense) will be the best beam to switch over to.

This might be the case e.g. when movement from position p1 to position p2 involves radio transceiver device 300 to pass from a position with line of sight to the radio transceiver device 200 to a position with no line of sight to the radio transceiver device 200.

Figure 2:
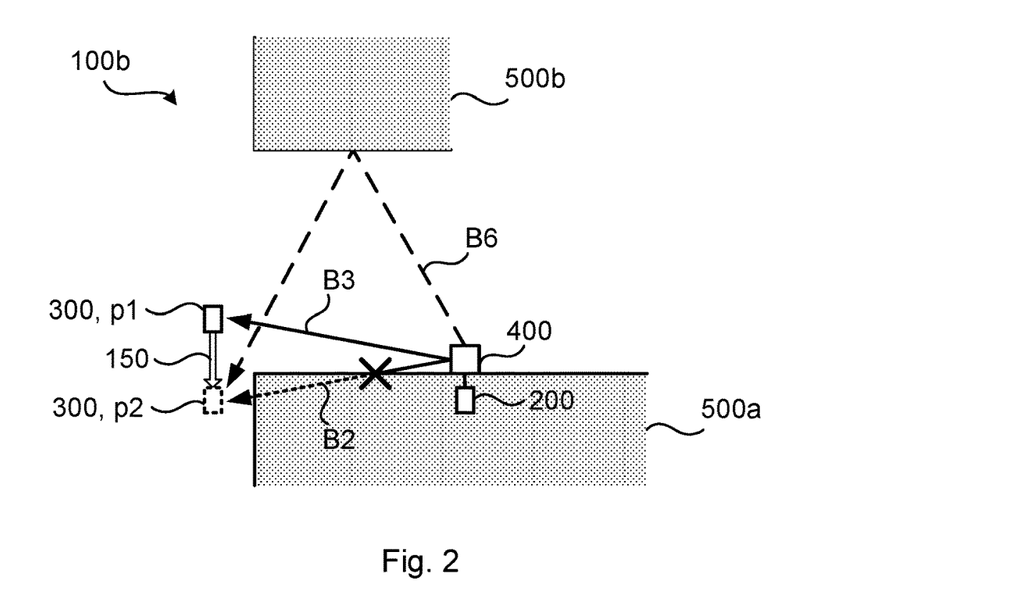

FIG. 2 schematically illustrates a communications network 100b representing a top view of a deployment scenario of the communications network low in FIG. 1. In the illustrative example of FIG. 2, movement from position p1 to position p2 causes radio transceiver device 300 to pass around a corner of a physical structure 500a, causing the line of sight to the radio transceiver device 200 to be broken.

After passing the corner, the strongest, and thus best candidate, beam might suddenly change to a beam transmitted in a significantly different angular direction and received by the radio transceiver device 300 at a strong reflection in another physical structure 500b, as exemplified by beam B6. If only beams, such as beams B1, B2, B4, B5, comparatively close in angle to the used beam B3 are tested, the best beam, as represented by beam B6, would be missed in this scenario. The embodiments disclosed herein enable the beam sweep procedure to take into account possible reflections from each beam, thus avoiding the best beam to be missed, e.g. in scenarios as disclosed above.

The embodiments disclosed herein particularly relate to mechanisms for initiating a beam sweep procedure. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figure 3:
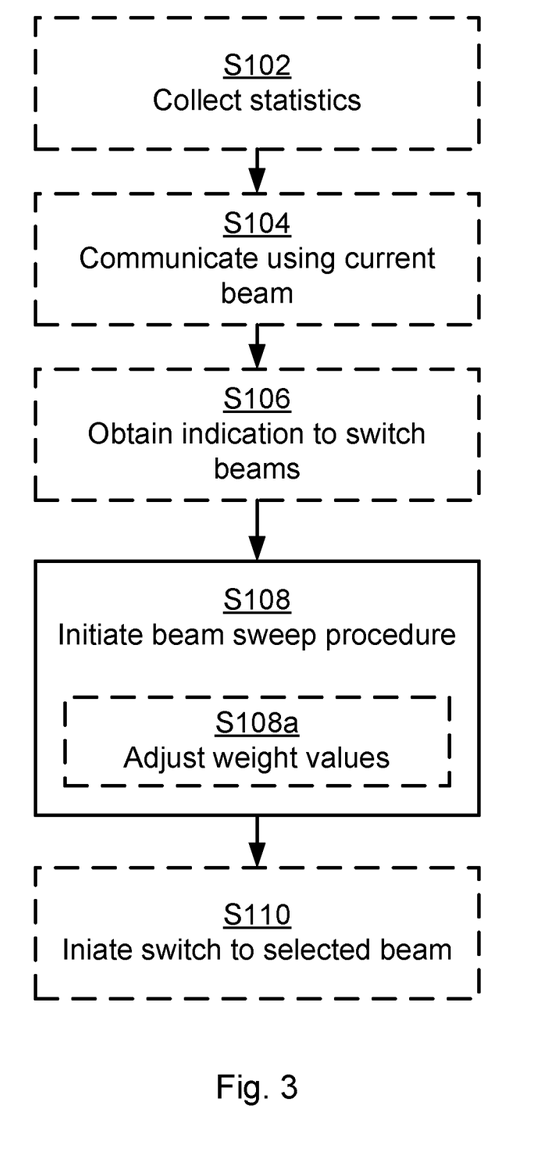
FIG. 3 is a flowchart of methods according to embodiments.

Reference is now made to FIG. 3 illustrating a method for initiating a beam sweep procedure as performed by the radio transceiver device 200 according to an embodiment.

As disclosed above, the beam sweep procedure should be performed such that the risk of missing candidate beams with pointing directions far from the used beam is reduced. This is resolved by considering the angular spread of the beams. Particularly, the radio transceiver device 200 is configured to perform step S108:

S108: The radio transceiver device 200 initiates, for a candidate beam set, a beam sweep procedure for communication with another radio transceiver device 300. Each beam in the candidate beam set has an associated angular spread value. During the beam sweep procedure, beams in the candidate beam set are swept in an order weighted according to the angular spread values.

Beams with high angular spread values might then be swept with higher priority than beams with low angular spread values. Further, beams with high angular spread values might then be selected with higher priority than beams with low angular spread values when determining which beams to include in the candidate beam set.

To find the best beam candidates to test in the beam sweep procedure, one of the criteria is thus to capture the possibility of using beams that have reflective objects in their environment. Beams having reflective objects in their environment might cover areas far off in angle compared to the actual respective pointing directions of these beams. That is, in some aspects the angular spread value associated with a given beam in the candidate beam set represents an indication of reflectiveness of that given beam.

Embodiments relating to further details of initiating a beam sweep procedure as performed by the radio transceiver device 200 will now be disclosed.

There may be different ways to determine the angular spread values of the beams. In some aspects statistics are collected per beam, where the statistics can be used to estimate the respective angular spread values of the beams. One measure of the angular spread is the rank used for each beam in the communication between the radio transceiver device 200 and the radio transceiver device 300. The higher the rank is, the higher the probability for reflections, and thus the higher angular spread value. Further examples of parameters that can be used to represent the angular spread will be given below. Particularly, according to an embodiment the radio transceiver device 200 is configured to perform (optional) step S102:

S102: The radio transceiver device 200 collects statistics of angular spread values per beam at least in the candidate beam set.

The angular spread values per beam might then be aggregated, e.g. by calculating the average angular spread value per beam. Statistics of the angular spread values might be collected during comparatively long times, such as from several hours to several weeks or more. It could be that the radio transceiver device 200 collects statistics of angular spread values per beam only in the candidate beam set or in all possible beams.

There may be different opportunities as to when the beam sweep procedure is initiated.

In some aspects the radio transceiver device 200 has an ongoing communication with the radio transceiver device 300 when the beam sweep procedure is initiated. Particularly, according to an embodiment the radio transceiver device 200 is configured to perform (optional) step S104:

S104: The radio transceiver device 200 communicates, using a current beam, with the radio transceiver device 300 before initiating the beam sweep procedure. The beam sweep procedure is then for continued communication with the radio transceiver device 300. The herein disclosed mechanisms can thus be used to reduce the risk of service interruption.

However, it is not necessary that any communications is ongoing before the beam search procedure is initiated. The beam sweep procedure could thus be used for an initial connection where the radio transceiver device 300 only listens to signals transmitted in the beams during the beam sweep procedure. Thus, in other aspects the radio transceiver device 300 is camping on a cell served by the radio transceiver device 200.

As noted above, during the beam sweep procedure, beams in the candidate beam set are swept in an order weighted according to the angular spread values. There may be different ways to explicitly order the beams in the candidate beam set. In some aspects the order is weighted so as to prioritize higher angular spread values over lower angular spread values. That is, this might cause beams with comparatively high angular spread values to be swept before beams with comparatively low angular spread values are swept. However, it could also be that beams with comparatively high angular spread values are swept more often than beams with comparatively low angular spread values. Further, in some aspects less than all possible beams are included in the candidate beam set. According to an embodiment the candidate beam set only includes beams with angular spread values larger than a threshold value. The threshold value could be set by the network, such as in a node of the radio access network 110 or in a node of the core network 120.

Yet further, the order in which the beams are swept, and/or how many times each beam is swept, might depend on other factors, or parameters as well. For example, the order in which the beams of the candidate beam set are swept might also depend on the angular direction, or pointing direction, of the beams so as to not miss beams that are close in angular direction to the currently used beam. That is, according to an embodiment the order further is weighted so as to prioritize smaller difference in angular direction to the current beam over larger angular difference to the current beam. Hence, this might enable a balance between prioritizing beams with high angular spread values and beams close in angular direction to the currently used beam.

There may be different ways to determine the angular spread. In some aspects the angular spread value for a given beam in the candidate beam set is given by a channel property of a physical radio propagation channel as experienced in that given beam. That is, since each beam has a different angular pointing direction, the physical radio propagation channel might be unique for each beam and thus the physical radio propagation channel as experienced in a first given beam might be different from the physical radio propagation channel as experienced in a second given beam. There could be different ways to estimate, or measure the channel property. In some aspects the channel property is based on estimates and/or measures of sounding reference signals or on channel state information (CSI) reports.

There could be different types of channel properties. According to an embodiment the channel property is a rank value, a delay spread, and/or a singular value ratio (SVR) for the physical radio propagation channel. Taking the rank as an example, the rank generally depends on the angular spread at the transmitter (i.e., at the TRP 400) and at the receiver (i.e., at the radio transceiver device 300). Angular spread generally depends on the existence (or lack thereof) of multiple radio propagation paths between transmitter and receiver in different angular directions and might therefore be regarded as an indication of reflections in the coverage area of the beam. In general, the rank increases with more reflections from surrounding objects, such as in the presence of physical structures 500a, 500b. Although the rank also generally depends on the position of the radio transceiver device 300 within a beam (i.e. on the distance between the TRP 400 and the radio transceiver device 300), the beam itself can be characterized as having a high probability or a low probability for high rank, and thus for high angular spread or low angular spread. This is based on the more or less unique physical radio propagation channel within the coverage area of each beam.

As noted above, in some aspects the radio transceiver device 200 has an ongoing communication with the radio transceiver device 300 when the beam sweep procedure is initiated. A current beam is used for the ongoing communication. It could then be that the radio transceiver device 200 obtains an indication of a need to switch from the current beam to another beam in order to continue the communication with the radio transceiver device 300. Particularly, according to an embodiment the radio transceiver device 200 is configured to perform (optional) step S106:

S106: The radio transceiver device 200 obtains an indication to switch from the current beam to another beam for continued communication with the radio transceiver device 300.

Examples of such indicates are received signal strength from the radio transceiver device 300 being below a threshold value, reception of a report from the radio transceiver device 300 indicating that the received signal strength from the radio transceiver device 200 is below a threshold value, lack of an anticipated message (such as a response message or an acknowledgment message) from the radio transceiver device 300 within a predefined time limit, etc.

There could be different ways for the radio transceiver device 200 to initiate the beam sweep procedure. In some aspects the current beam is generated by beamforming of an antenna arrangement of the radio transceiver device 200. Then, according to an embodiment the radio transceiver device 200 is configured to perform (optional) step S108a as part of initiating the beam sweep procedure in step S108:

S108a: The radio transceiver device 200 adjusts weight values of the beamforming so as to sweep through the beams in the candidate beam set according to the order.

In some aspects the antenna arrangement is provided at at least one TRP 400 of the radio transceiver device 200. That is, one and the same radio transceiver device 200 could be configured to perform beam sweeping using at least one TRP 400.

There could be different kinds of weight values of the beamforming that are adjusted. In some aspects the weight values are precoder weights being applied to a signal to be transmitted by the antenna arrangement.

In some aspects the beam sweep procedure comprises transmission of beam reference signals, such as channel state information reference signals (CSI-RS) in the candidate beam set. The radio transceiver device 300 the measures on the received reference signals and reports back a signal quality measure per beam (such as signal strength and/or rank value) to the radio transceiver device 200 for the radio transceiver device 200 to be able to determine which beam in the candidate beam set to use for communications with the radio transceiver device 300.

In some aspects the beam sweep procedure thus results in that a beam in the candidate beam set is selected for continued communication with the radio transceiver device 300. In some aspects one of the candidate beams is selected for communication with the radio transceiver device 300. Particularly, according to an embodiment the radio transceiver device 200 is configured to perform (optional) step S110:

S110: The radio transceiver device 200 initiates a switch to one of the beams in the candidate beam set for communication with the radio transceiver device 300.

There could be different ways to determine to which beam to switch for communication with the radio transceiver device 300. In some aspects the selection criteria for which beam to switch to is based on at least one of signal strength and rank. Particularly, according to an embodiment the beam in the candidate beam set to which the switch is initiated is selected based on at least one of signal strength and rank value.

There could be different examples of signal strength values. According to non-limiting examples the signal strength value is represented by a signal to noise ratio (SNR) value, a signal to interference plus noise ratio (SINR) value, a path loss value, or a channel quality indicator (CQI) value.

There could be different examples of rank values. According to non-limiting examples the rank value is represented by a channel rank value, a spatial multiplexing rank value, channel state information (CSI) report, a singular value ratio (SVR), a condition number, or a rank indicator (RI). In some aspects the signal strength value and the rank value are jointly obtained as a channel capacity measure.

Figure 4:
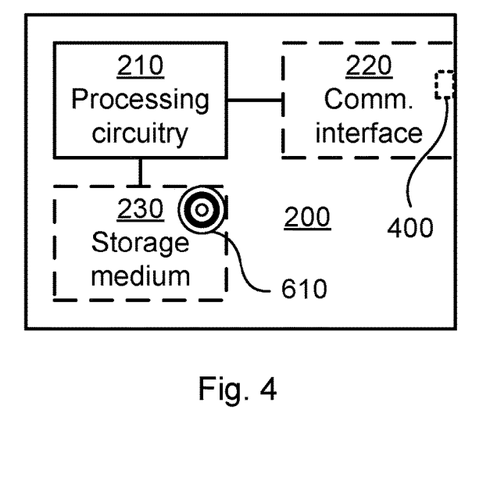
FIG. 4 is a schematic diagram showing functional units of a radio transceiver device 200 according to an embodiment.

FIG. 4 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S110, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with other entities, nodes, functions and devices, such as the radio transceiver device 300, within the communications network 100. As such the communications interface 220 may comprise one or more transmitters and receivers, comprising analogue and digital components. Signals could be transmitted from, and received by, a TRP 400 of the radio transceiver device 200. The TRP 400 could form an integral part of the radio transceiver device 200 or be physically separated from the radio transceiver device 200. The communications interface 220 might thus optionally comprise the TRP 400.

The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 5:
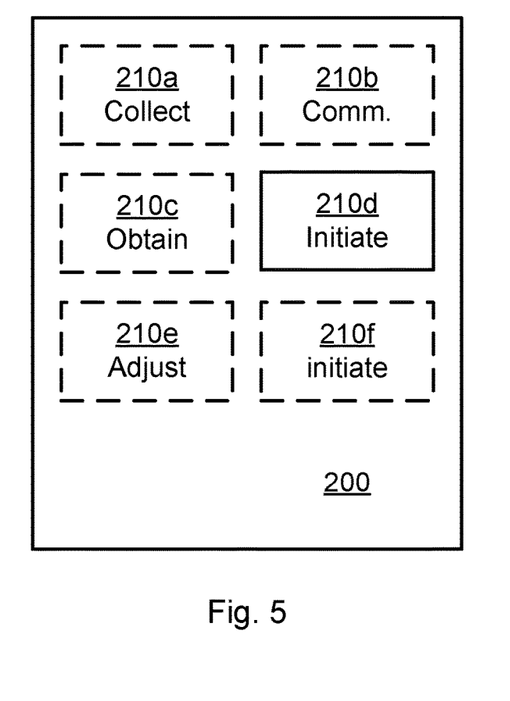
FIG. 5 is a schematic diagram showing functional modules of a radio transceiver device according to an embodiment.

FIG. 5 schematically illustrates, in terms of a number of functional modules, the components of a radio transceiver device 200 according to an embodiment. The radio transceiver device 200 of FIG. 5 comprises an initiate module 210*d* configured to perform step S108. The radio transceiver device 200 of FIG. 5 may further comprise a number of optional functional modules, such as any of a collect module 210*a* configured to perform step S102, a communications module 210*b* configured to perform step S104, an obtain module 210C configured to perform step S106, an adjust module 210*e* configured to perform step S108*a*, and an initiate module 210*f* configured to perform step S110. In general terms, each functional module 210*a*-210*f* may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210*a*-210*f* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*f* and to execute these instructions, thereby performing any steps as disclosed herein.

The radio transceiver device 200 may be provided as a standalone device or as a part of at least one further device. For example, the radio transceiver device 200 may be provided in a node of the radio access network 110 (as in the illustrative example of FIG. 1) or in a node of the core network 120. Alternatively, functionality of the radio transceiver device 200 may be distributed between at least two devices, or nodes. These at least two nodes, or devices, may either be part of the same network part (such as the radio access network or the core network) or may be spread between at least two such network parts.

Thus, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 4 the processing circuitry 210 may be distributed among a plurality of devices, or nodes. The same applies to the functional modules 210*a*-210*f* of FIG. 5 and the computer program 620 of FIG. 6 (see below).

Figure 6:
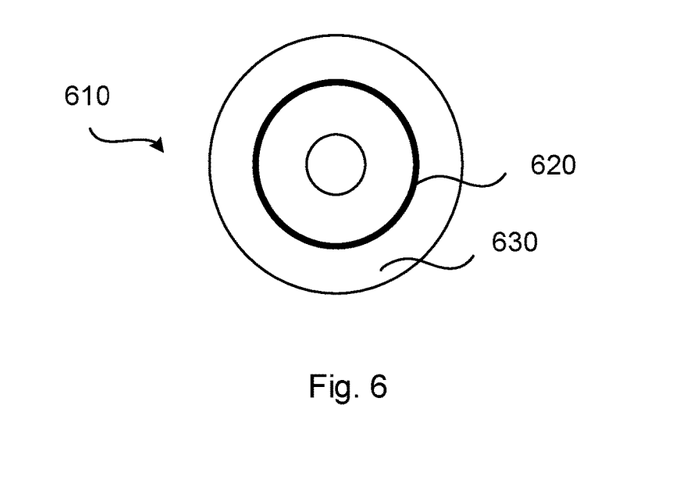
FIG. 6 shows one example of a computer program product comprising computer readable storage medium according to an embodiment.

FIG. 6 shows one example of a computer program product 610 comprising computer readable storage medium 630. On this computer readable storage medium 63*o*, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for initiating a beam sweep procedure, the method being performed by a radio transceiver device, the method comprising:
  initiating, for a candidate beam set, a beam sweep procedure for communication with another radio transceiver device, each beam in the candidate beam set has an associated angular spread value; and
  during the beam sweep procedure, beams in the candidate beam set are swept in an order weighted according to the angular spread values, the order being weighted so as to prioritize higher angular spread values over lower angular spread values.

2. The method according to claim 1, further comprising:
  communicating, using a current beam, with the another radio transceiver device before initiating the beam sweep procedure, and wherein the beam sweep procedure is for continued communication with the another radio transceiver device.

3. The method according to claim 1, wherein the angular spread value associated with a given beam in the candidate beam set represents an indication of reflectiveness of that given beam.

4. The method according to claim 1, wherein the angular spread value for a given beam in the candidate beam set is given by a channel property of a physical radio propagation channel as experienced in that given beam.

5. The method according to claim 4, wherein the channel property is based on one of sounding reference signals and a channel state information report.

6. The method according to claim 4, wherein the channel property is at least one of a rank value, a delay spread, and a singular value ratio, SVR, for the physical radio propagation channel.

7. The method according to claim 1, wherein the candidate beam set only includes beams with angular spread values larger than a threshold value.

8. The method according to claim 1, wherein the order further is weighted so as to prioritize smaller difference in angular direction to the current beam over larger angular difference to the current beam.

9. The method according to claim 1, wherein the beam sweep procedure comprises transmission of beam reference signals, the beam reference signals being channel state information reference signals, CSI-RS.

10. The method according to claim 1, further comprising:
  collecting statistics of angular spread values per beam at least in the candidate beam set.

11. The method according to claim 1, further comprising:
  obtaining an indication to switch from the current beam to another beam for continued communication with the another radio transceiver device.

12. The method according to claim 1, further comprising:
  initiating a switch to one of the beams in the candidate beam set for communication with the another radio transceiver device.

13. The method according to claim 12, wherein the beam in the candidate beam set to which the switch is initiated is selected based on at least one of signal strength and rank value.

14. The method according to claim 13, wherein the signal strength value is represented by one of a signal to noise ratio, SNR, value, a signal to interference plus noise ratio, SINR, value, a path loss value, and a channel quality indicator, CQI, value.

15. The method according to claim 13, wherein the rank value is represented by one of a channel rank value, a spatial multiplexing rank value, channel state information, CSI, report, a singular value ratio, SVR, a condition number, and a rank indicator, RI.

16. The method according to claim 13, wherein the signal strength value and the rank value are jointly obtained as a channel capacity measure.

17. The method according to claim 1, wherein the current beam is generated by beamforming of an antenna arrangement of the radio transceiver device, and wherein initiating the beam sweep procedure comprises:
  adjusting weight values of the beamforming so as to sweep through the beams in the candidate beam set according to the order.

18. The method according to claim 17, wherein the weight values are precoder weights being applied to a signal to be transmitted by the antenna arrangement.

19. The method according to claim 17, wherein the antenna arrangement is provided at at least one transmission and reception point, TRP, of the radio transceiver device.

20. A radio transceiver device for initiating a beam sweep procedure, the radio transceiver device comprising:
  processing circuitry, the processing circuitry being configured to cause the radio transceiver device to:
    initiate, for a candidate beam set, a beam sweep procedure for communication with another radio transceiver device, each beam in the candidate beam set has an associated angular spread value; and
    during the beam sweep procedure, beams in the candidate beam set are swept in an order weighted according to the angular spread values, the order being weighted so as to prioritize higher angular spread values over lower angular spread values.

21. A radio transceiver device for initiating a beam sweep procedure, the radio transceiver device comprising:
  processing circuitry; and
  a storage medium storing instructions that, when executed by the processing circuitry, cause the radio transceiver device to:
    initiate, for a candidate beam set, a beam sweep procedure for communication with another radio transceiver device, each beam in the candidate beam set has an associated angular spread value; and
    during the beam sweep procedure, beams in the candidate beam set are swept in an order weighted according to the angular spread values, the order being weighted so as to prioritize higher angular spread values over lower angular spread values.

22. A non-transitory computer storage medium storing a computer program for initiating a beam sweep procedure, the computer program comprising computer code which, when run on processing circuitry of a radio transceiver device, causes the radio transceiver device to:
  initiate, for a candidate beam set, a beam sweep procedure for communication with another radio transceiver device, each beam in the candidate beam set has an associated angular spread value; and during the beam sweep procedure, beams in the candidate beam set are swept in an order weighted according to the angular spread values, the order being weighted so as to prioritize higher angular spread values over lower angular spread values.

* * * * *